United States Patent [19]
Dedonato

[11] Patent Number: 5,558,565
[45] Date of Patent: Sep. 24, 1996

[54] GLASS PATTERN CUTTING DEVICE

[76] Inventor: Victor Dedonato, 2833 Locust Dr., Pittsburgh, Pa. 15241

[21] Appl. No.: 509,125

[22] Filed: Jul. 31, 1995

[51] Int. Cl.⁶ .................................................. B24B 7/00
[52] U.S. Cl. .......................... 451/70; 451/144; 83/879; 83/565; 225/96
[58] Field of Search .................... 83/879, 565, 437, 83/51, 885, 880; 451/70, 44, 69, 237, 239, 242, 246, 257, 332, 334, 412, 72; 225/2, 96

[56] References Cited

U.S. PATENT DOCUMENTS

| | | | |
|---|---|---|---|
| 2,116,680 | 5/1938 | Hawkes | 83/565 |
| 2,203,389 | 6/1940 | Kurtz | 83/565 |
| 2,352,608 | 7/1944 | Archer | 451/239 |
| 2,445,971 | 7/1948 | Rosen | 451/239 |
| 2,579,337 | 12/1951 | Reaser et al. | 451/239 |
| 2,712,169 | 7/1955 | Buttress | 83/51 |
| 2,741,072 | 4/1956 | Pruitt | 451/239 |
| 2,782,569 | 2/1957 | Robbins | 451/239 |
| 2,906,065 | 9/1959 | Reaser | 451/239 |
| 3,274,736 | 9/1966 | Brokaw | 451/239 |
| 4,120,220 | 10/1978 | Mullen | 83/886 |
| 4,446,768 | 5/1984 | Sirmans | 83/879 |
| 4,762,039 | 8/1988 | Rimmele | 83/51 |
| 4,939,968 | 7/1990 | Stoof | 83/886 |
| 5,109,742 | 5/1992 | Strong | 83/437 |
| 5,221,034 | 6/1993 | Bando | 225/96.5 |
| 5,396,736 | 3/1995 | Bando | 451/5 |

OTHER PUBLICATIONS

"The Source", Stained Glass Catalog, Hudson Glass, Co., Inc., cover and pp. 27–30, 1993.

*Primary Examiner*—James G. Smith
*Assistant Examiner*—Dona C Edwards
*Attorney, Agent, or Firm*—Webb Ziesenheim Bruening Logsdon Orkin & Hanson, P.C.

[57] ABSTRACT

The present invention provides a glass cutting apparatus for cutting glass to a predetermined pattern. The glass cutting apparatus includes a rotatable workpiece holder which is adapted to rotatably hold a glass workpiece and overlaying pattern thereon. A cutting unit is provided which includes at least one cutter blade for scoring the glass workpiece which is held by the workpiece holder, and a pattern follower which is adapted to abut against the pattern held by the workpiece holder during the scoring of the glass workpiece by the cutter blade. The glass cutting apparatus of the present invention may additionally include a grinding unit having a rotatable grinder for grinding an edge of the glass workpiece held by the workpiece holder and a pattern follower adapted to abut against the pattern held by the workpiece holder during grinding of the edge of the glass workpiece by the grinder. This glass cutting apparatus will allow for quick and easy glass cutting, and duplication of glass pieces according to preset patterns.

16 Claims, 8 Drawing Sheets

1

GLASS PATTERN CUTTING DEVICE

BACKGROUND OF THE INVENTION

1. Field of the Invention

The present invention relates to a glass cutting apparatus, more specifically, to a glass cutting apparatus for cutting glass according to a predetermined pattern.

2. Description of the Prior Art

In the fields of stained and art glass work, glass cutting techniques and devices are critical in view of the intricate glass shapes that are required. U.S. Pat. Nos. 4,939,968; 4,120,220; and 4,446,768 disclose glass cutting devices of various designs. As discussed in these prior art patents, hand tools have often been utilized for glass cutting but hand held glass cutters have significant drawbacks, particularly when cutting complex curves. The various glass cutting apparatus disclosed in the prior art patents simplify some of the difficult aspects in glass cutting. However, these prior art devices do not easily and consistently replicate a glass workpiece according to a given pattern. In general, in the prior art, the shape of the pattern is drawn onto the glass workpiece and the apparatus utilized is used to score the glass along the drawn guideline. However, this technique does not yield a high degree of uniformity in the shape of identically patterned glass workpieces.

It is an object of the present invention to provide a glass cutting apparatus for easily and consistently cutting a glass workpiece into a pattern shape. It is a further object of the present invention to provide a cutting apparatus which is easy to use and easy to manufacture.

SUMMARY OF THE INVENTION

Therefore, I have developed a glass cutting apparatus for cutting glass workpieces according to a predetermined pattern. The glass cutting apparatus includes a workpiece holder adapted to simultaneously hold a glass workpiece and a pattern thereon. A cutting unit is provided having at least one cutter blade for scoring the glass workpiece, which is held by the workpiece holder, and a pattern follower adapted to abut against the pattern held by the workpiece holder during the scoring of the glass workpiece by the cutter blade.

The present invention may additionally include a grinding unit with a rotatable grinder for grinding an edge of the glass workpiece which is held by the workpiece holder and a grinding unit pattern follower adapted to abut against the pattern held by the workpiece holder during grinding of the edge of the glass workpiece by the grinder. The glass cutting apparatus of the present invention may include a workpiece support table adapted to support a glass workpiece thereon with the table including a slidable backstop adapted to abut against an end of the glass workpiece supported on the table. The table is useful for making linear cuts on glass workpieces. The glass cutting apparatus of the present invention may provide a base with the work holder, cutting unit, grinding unit and table adapted to be positioned at various spaced locations on the base.

The cutting unit of the present invention may comprise upper and lower radial arms spaced from each other and adapted to be positioned on opposed sides of the glass held by the workpiece holder. A cutting blade is on one or both of the radial arms and the pattern follower attached to one of the radial arms. The radial arms can be biased toward each other to an operative position. The operative position of the radial arms may be adjustable. The radial arms may be movable away from each other out of the operative position allowing insertion of the glass workpiece therebetween.

Other features and advantages of the present invention will become apparent from the following detailed description in conjunction with the accompanying drawings.

BRIEF DESCRIPTION OF THE PREFERRED EMBODIMENTS

Figure 1:
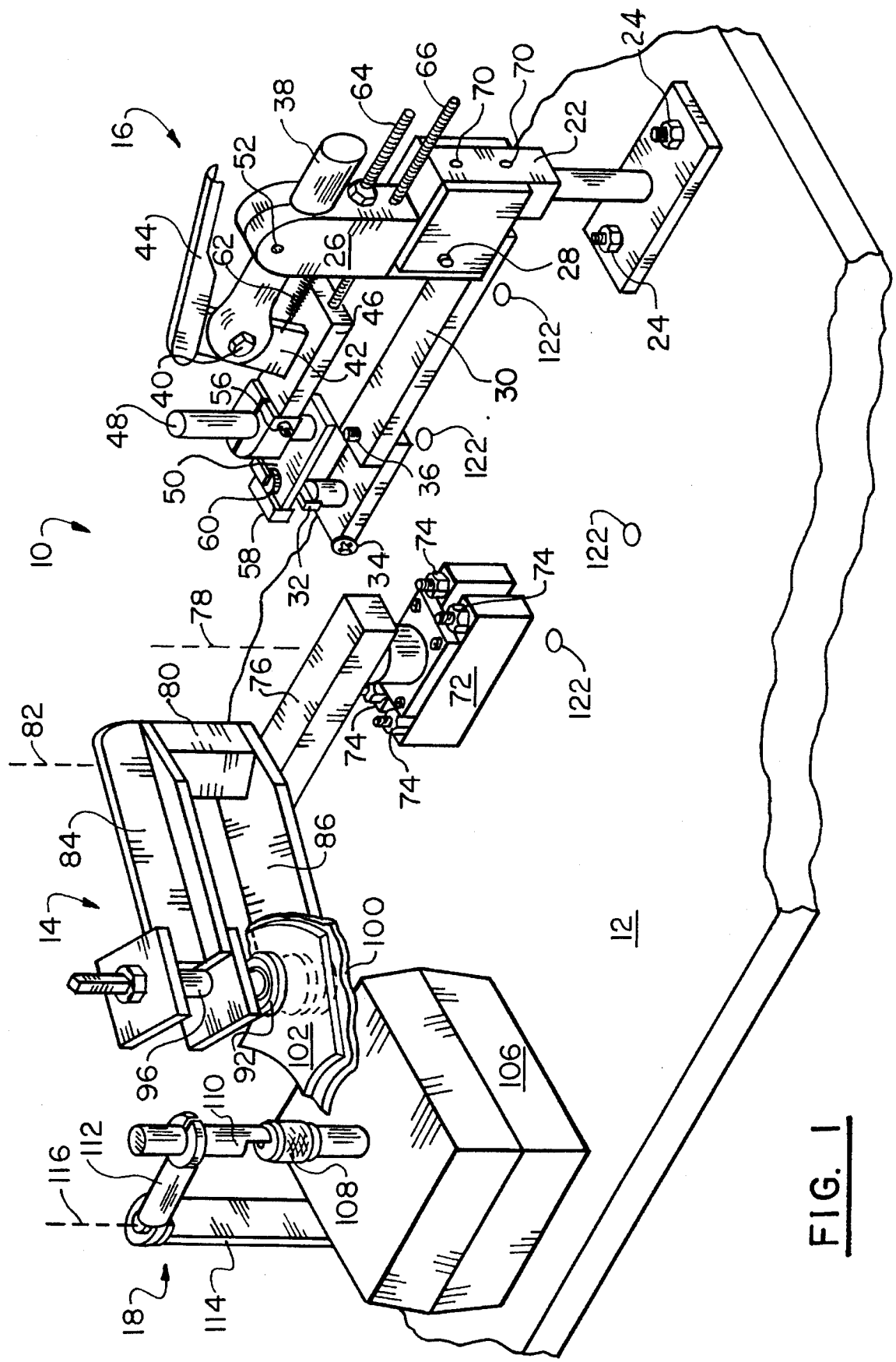
FIG. 1 is perspective view of a glass cutting apparatus according to the present invention.

FIG. 1 is a perspective view of the glass cutting apparatus 10 according to the present invention. The glass cutting apparatus 10 includes a base 12 to which a workpiece holder 14, cutting unit 16, grinding unit 18 and table 20 (shown in FIG. 6) are attached.

Figure 2:
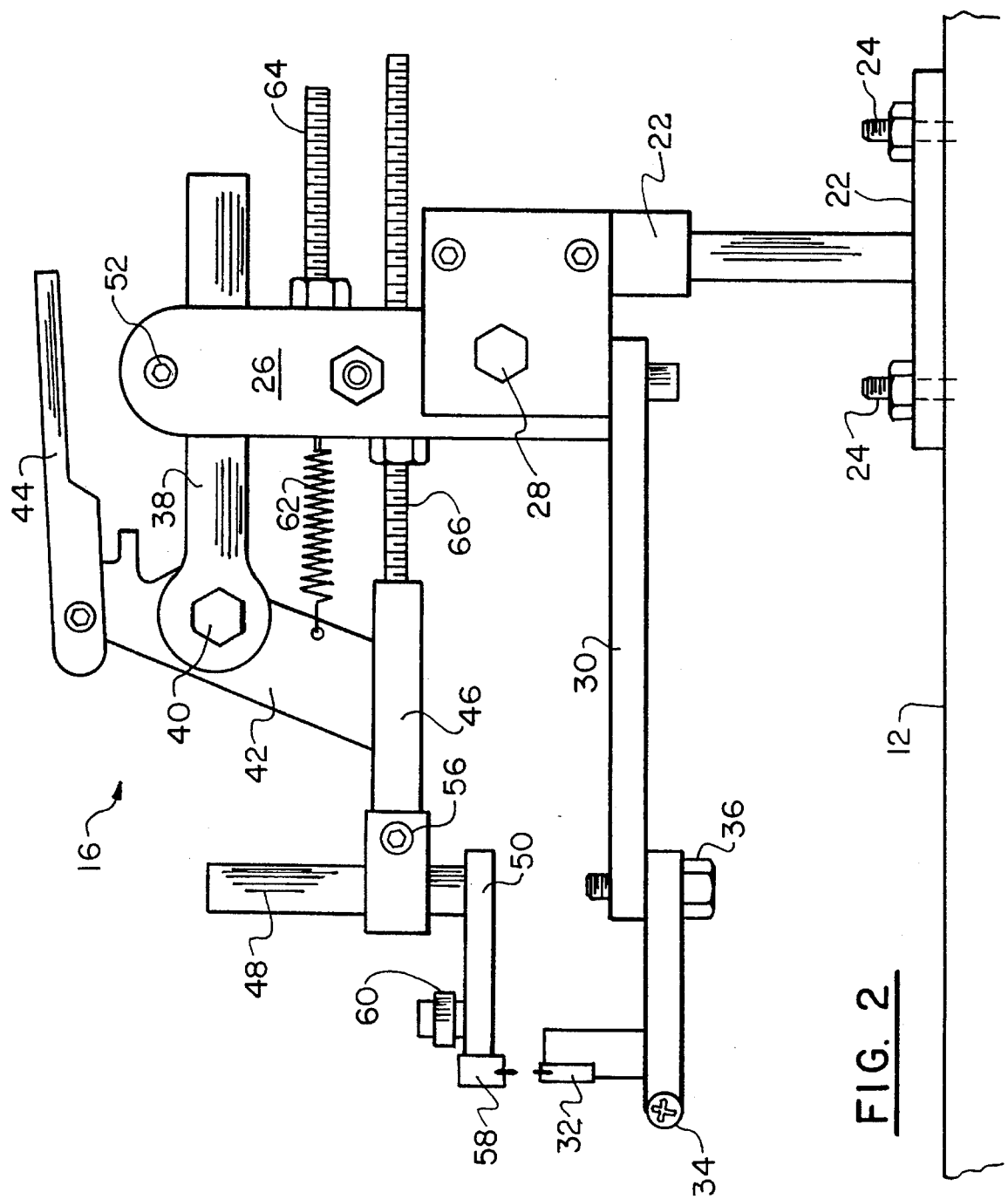
FIG. 2 is a side view of a cutting unit of the glass cutting apparatus illustrated in FIG. 1.
Figure 3:
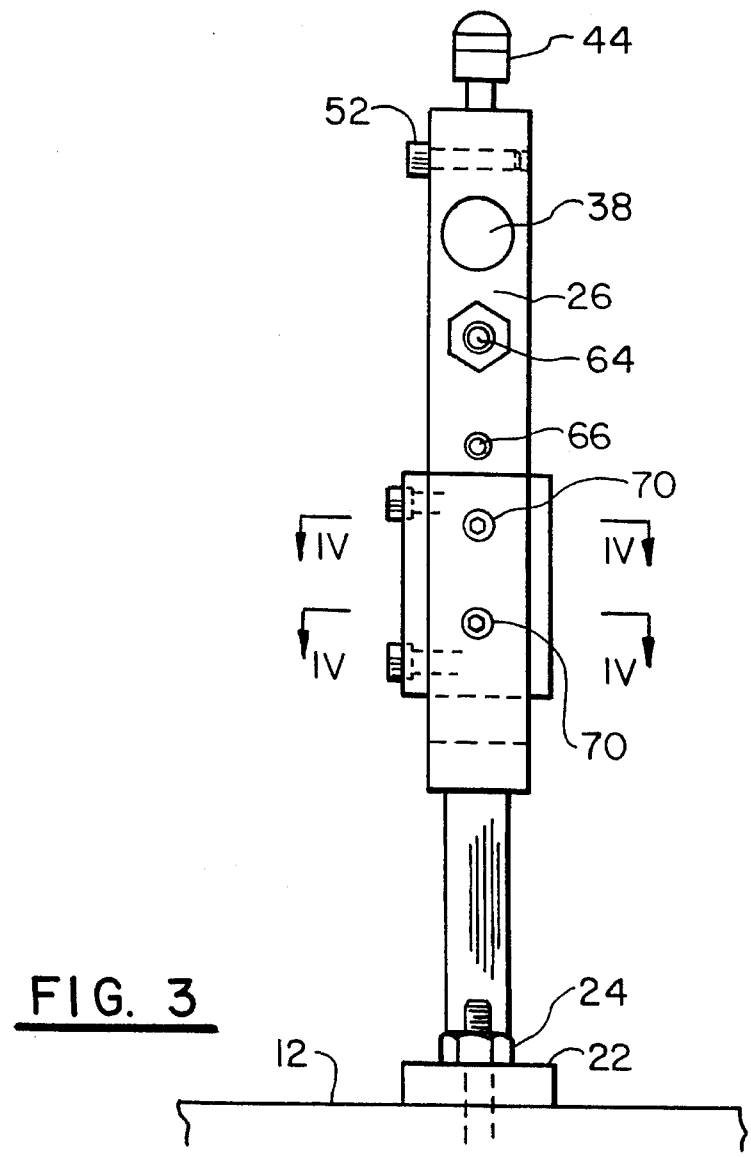
FIG. 3 is a back view of the cutting unit illustrated in FIG. 2.
Figure 4:
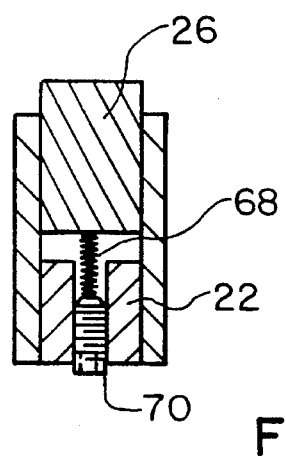
FIG. 4 is a sectional view of the cutting unit illustrated in FIG. 3 taken along section line IV—IV.

The details of the cutting unit 16 are best illustrated in FIGS. 2–4. The cutting unit 16 includes a base stand 22 secured to the base 12 by nut and bolt connections 24. A connecting arm 26 is pivotally attached to the base stand 22 by pivot pin 28. A lower radial arm 30 is attached at a first end thereof to the connecting arm 26. A lower cutting blade assembly 32 is attached to a second end of the lower radial arm 30. A clamping screw 34 provides for secure attachment and rotational adjustment of the lower cutting blade assembly 32 relative to the lower radial arm 30. The outer portion of the lower radial arm 30, which includes the attached lower cutting blade assembly 32, can be removed and minor adjustments made by provision of a separate attachment bolt 36.

An upper radial arm extends from an upper portion of the connecting arm 26 and is formed of a radial adjustment post 38, pivot pin 40, pivot plate 42, handle 44, arm 46, vertical adjustment post 48 and mounting member 50. The radial adjustment post 38 is slidably received within the connecting arm 26 and locked into an appropriate position by clamping screw 52. The radial adjustment post 38 allows for adjusting of the upper radial arm relative to the connecting arm 26. The remaining portions of the upper radial arm are pivoted to the radial adjustment post 38 by pivot pin 40 extending through pivot plate 42. An upper portion of the pivot plate 42 includes a handle 44 for ease of pivoting the upper radial arm out of the operative position as will be discussed hereinafter. The arm 46 is attached to a lower end of the pivot plate 42 which is opposite from the handle 44. The vertical adjustment post 48 is adjustably positioned within the arm 46 and clamped into an appropriate position by clamping screw 56. The vertical adjustment post 48 thereby provides for vertical adjustment of the remaining portions of the upper radial arm. The mounting member 50 is attached at a first end thereof to a lower end of the vertical adjustment post 48. An upper cutting blade assembly 58 is attached to an opposite end of the mounting member 50. Additionally, a pattern following wheel 60 is rotatably attached to the mounting member 50 and is substantially adjacent the upper cutting blade assembly 58.

The upper cutting blade assembly 58 is aligned with the lower cutting blade assembly 32 as shown in FIG. 2. The various adjustments provided in both the lower radial arm 30 and the upper radial arm can be utilized to assure the appropriate adjustment in alignment of the lower cutting blade assembly 32 and upper cutting blade assembly 58.

The upper radial arm is spring biased toward the lower radial arm 30 by a spring 62 extending between the connecting arm 26 and the pivot plate 42. A spring tension adjustment screw 64 is provided for adjusting the tension in the spring 62. An adjustable stop 66 is slidably coupled to the connecting arm 26 and positioned such that the arm 46 will abut against the end of the stop 66 when the radial arms are in the operative position as shown in FIG. 2. The position of the stop 66 can be adjusted by threading the stop 66 into or out of the connecting arm 26 thereby adjusting the relative stopping position of the arm 46 and the upper radial arm. The stop 66 together with the vertical adjustment post 48 can be utilized to adjust the relative position and alignment between the lower cutting blade assembly 32 and the upper cutting blade assembly 58 in the operative position. Additionally, one of cutting blade assemblies 32 or 58 may be removed and replaced with a follower wheel which would provide for scoring only on one side of the glass workpiece.

As discussed above, the connecting arm 26 is pivoted to the base stand 22 by pivot pin 28. This pivoting allows for a small amount of floating or adjustment to be provided so that the spaced cutting blade assemblies 32 and 58 can adjust to the height and positioning of the specific glass workpiece which is being cut. As shown in FIGS. 3 and 4, a spring 68 may be provided above and below the pivot pin 40 to maintain the cutting arm 26 in a substantially vertical equilibrium position. The spring 68 will extend from a tension adjustment stud 70 to the connecting arm 26 as shown in FIG. 4.

Figure 5:
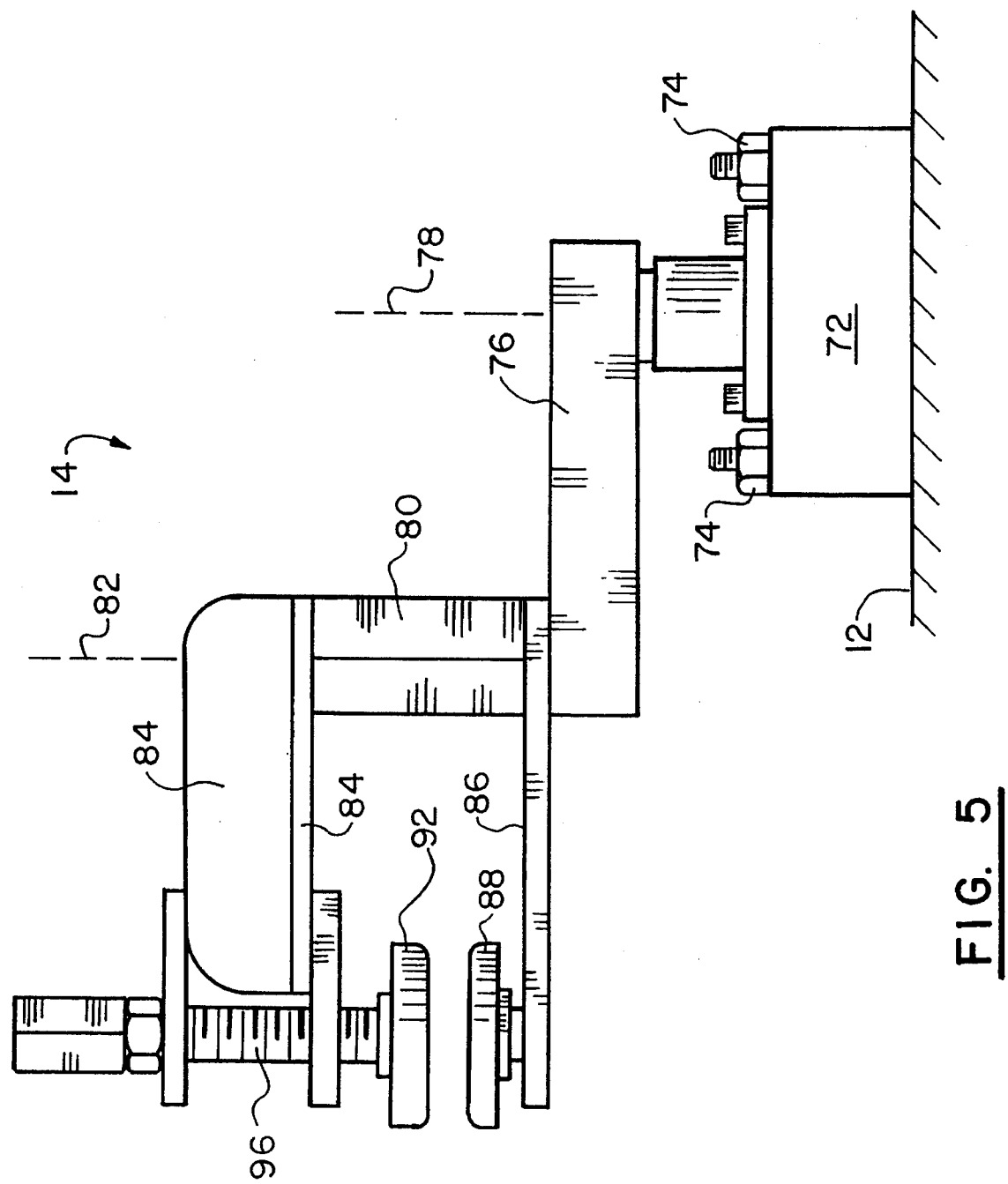
FIG. 5 is a side view of a workpiece holder according to the cutting apparatus illustrated in FIG. 1.
Figure 7:
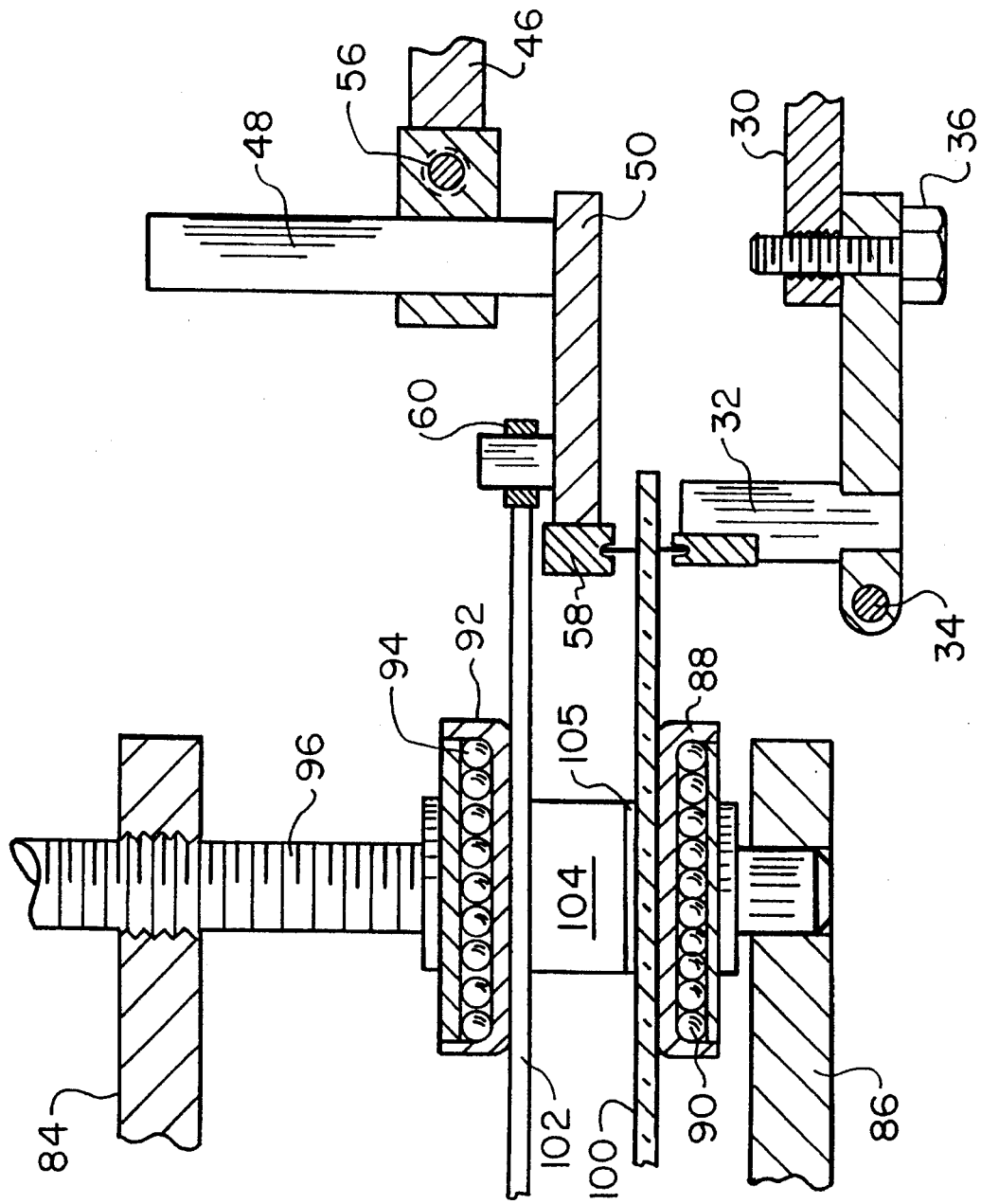
FIG. 7 is a sectional view of a portion of the cutting unit and workpiece holder of the glass cutting apparatus during cutting operation.
Figure 8:
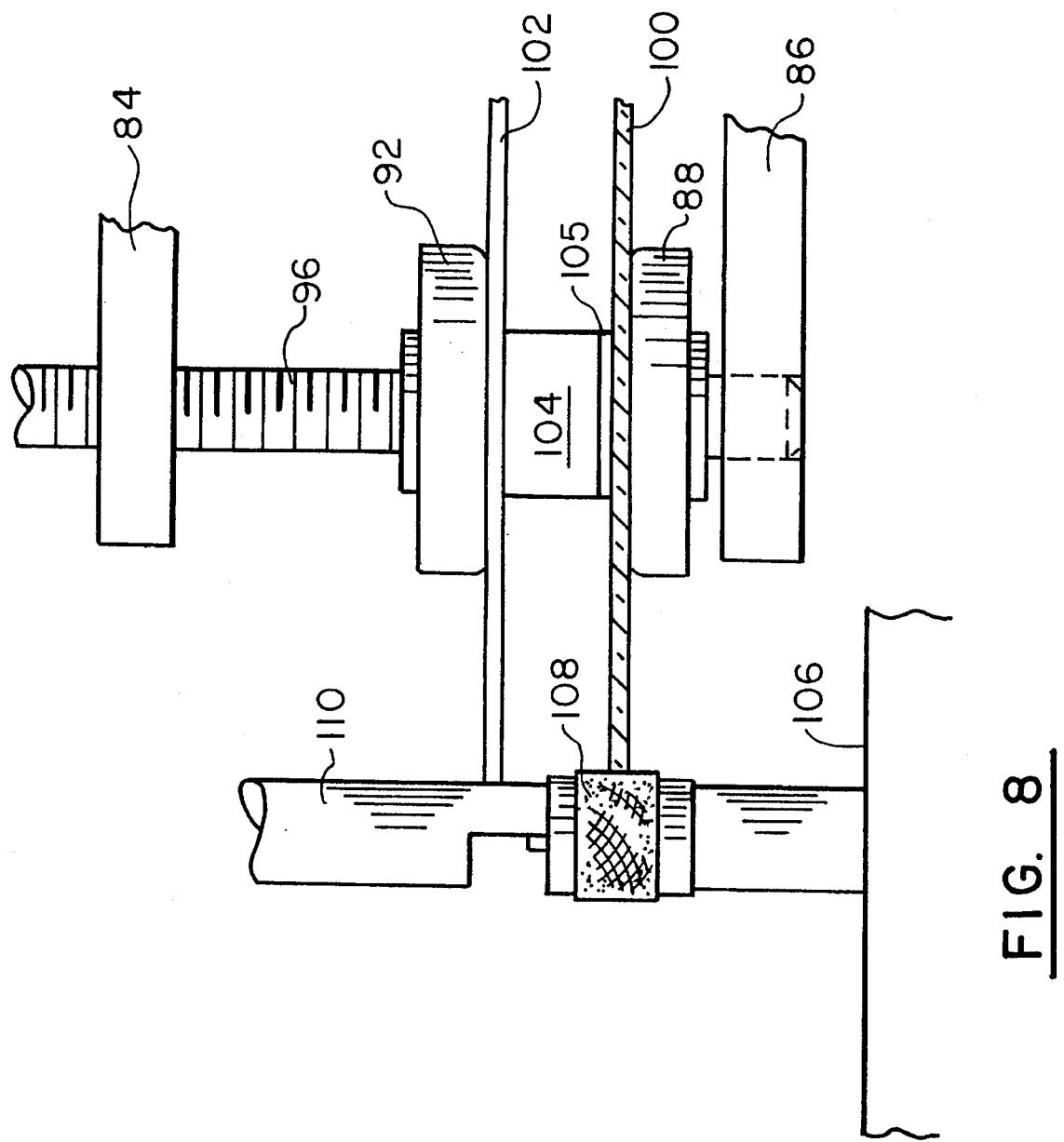
FIG. 8 is an enlarged side view of the workpiece holder and a grinding unit of the glass cutting apparatus of the present invention during a grinding operation.

FIG. 5 illustrates the workpiece holder 14 according to the present invention. The workpiece holder 14 includes a base member 72 secured to the base 12 by nut and bolt connections 74. A support arm 76 is rotatably attached in one end thereof to the base member 72 to be pivotable about an axis 78 as shown in FIGS. 1 and 5. A generally C-shaped frame 80 is rotatably attached to a second end of the support arm 76 for rotation about an axis 82. The frame 80 includes an upper arm 84 and lower arm 86. The lower arm 86 includes a lower clamping member 88 rotatably attached at one end thereof. Ball bearings 90, shown in FIG. 7, provide for rotation of the lower clamping member 88 relative to the lower arm 86. The upper arm 84 includes an opposed upper clamping member 92 rotatably attached through ball bearings 94 to a threaded post 96 threadably received in one end of the upper arm 84. As shown in FIGS. 1, 7 and 8, the opposed clamping members 88 and 92 cooperate to rotatably secure a glass workpiece 100 and associated pattern 102 therebetween. A spacer 104 is provided between the glass workpiece 100 and the pattern 102 to assure that the pattern 102 is at the appropriate height as will be discussed hereinafter. The spacer 104 is preferably attached to the pattern 102. The spacer 104 includes a rubber bottom surface 105 to increase friction between the spacer 104 and the glass workpiece 100 to prevent relative movement between the glass workpiece 100 and the pattern 102 during scoring or grinding operations. The pattern 102 may be made out of ceramic or wood or other material which is relatively easy to work with to form the desired patterned shapes. In general, a wide variety of different shaped patterns 102 would be prepared for one complete work, such as a stained glass window.

The grinding unit 18 illustrated in FIGS. 1 and 8 includes a base housing 106 which may be coupled to the base 12 in a conventional fashion. A rotatable grinder 108 is powered in conventional fashions, such as by a motor housed within the base housing 106. Positioned above the rotatable grinder 108 is a pattern guide tube 110. The pattern guide tube 110 is adjustably attached to a horizontal support arm 112. The support arm 112 is pivotally attached to vertical support 114 and adapted for adjustment by rotation about axis 116. The movement of the support arm 112 about axis 116 relative to the vertical support 114 will allow for the appropriate positioning of the radial face of the pattern guide tube 110 relative to the radial face of the rotatable grinder 108. The vertical support 114 can be attached to the base 12 but preferably is attached to the base housing 106 in a conventional fashion allowing for movement of the grinding unit 18 as an integral unit. As shown in FIGS. 1 and 8, a recess is provided in the back portion of the lower end of the pattern guide tube 110 so that there is no interference in the adjustment of the pattern guide tube 110 relative to the rotatable grinder 108. Additionally, it is preferable that the radius curvature of the pattern guide tube 110 be substantially equal to that of the rotatable grinder 108. Maintaining the same radius between these elements will assure a correct grinding position between the grinding face of the rotatable grinder 108 and the edge of the glass workpiece 100.

Figure 6:
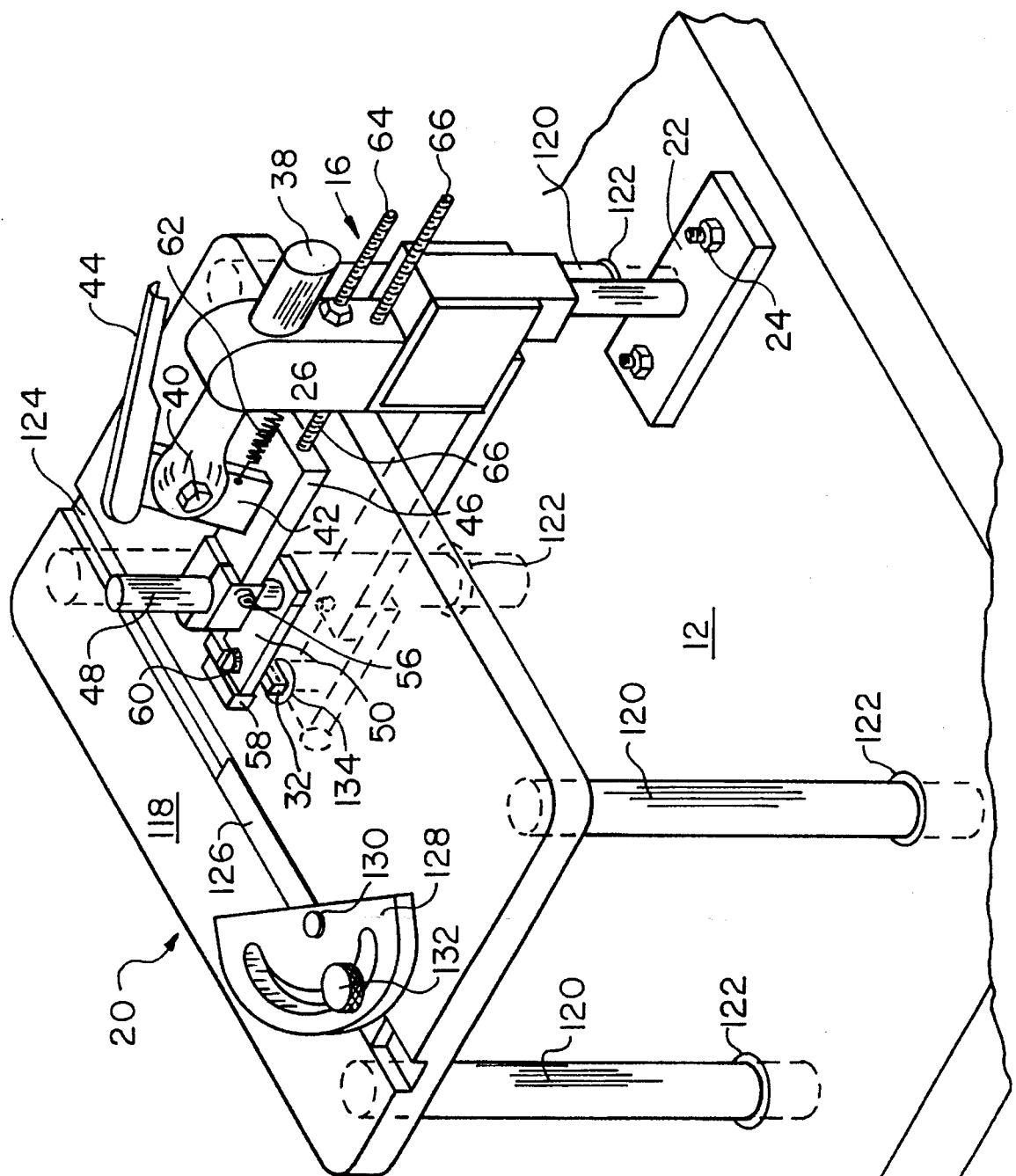
FIG. 6 is a perspective view of the cutting unit and a workpiece support table according to the cutting apparatus of the present invention.

The work support table 20 illustrated in FIG. 6 includes a substantially planar workpiece, supporting table surface 118 with a plurality of legs 120 extending down therefrom. The legs 120 are received within a plurality of location holes 122 positioned within the base 12 to quickly and removably attach the table 20 to the base 12. A straight track 124 extends across the top of table surface 118 and slidably receives a guide member 126 of a slidable backstop 128 therein. Backstop 128 is pivoted to the guide member 126 about pin 130 to be angularly adjustable relative to the table 118. The backstop 128 is secured in the appropriate angular position by set screw 132. A cutting blade assembly receiving hole 134 is positioned within the table surface 118 such that it will receive the associated lower cutting blade assembly 32 and upper cutting blade assembly 58 when the table 20 is positioned on the base 12 as illustrated in FIG. 6. The table 20 is advantageous for the linear cutting or scoring of a glass workpiece 100 which does not require the use of a pattern 102. By the provision of the angularly adjustable backstop 128, various linear cuts at varying angles can be provided on the glass workpiece. In the operation of the present invention, the table 20 may be utilized for cutting a large glass workpiece 100 down to a square or other polygonal structure which is larger than, but generally approximates, the desired pattern 102.

After the glass workpiece has been cut into a usable shape, the pattern 102, spacer 104 and glass workpiece 100 can be clamped onto the workpiece holder 14 as shown in FIGS. 1, 7 and 8. Within the context of the present invention, a glass workpiece 100 of usable shape will generally be a glass workpiece having dimension which fits within the frame 80 of the workpiece holder 14 for rotation without interfering with the frame 80 and additionally, without interfering or contacting the connecting arm 26 of the cutting unit 16.

With the glass workpiece 100, spacer 104 and pattern 102 securely clamped into the workpiece holder 14, the user can quickly cut or score the glass on the cutting unit 16 as illustrated in FIG. 7. The handle 44 can be utilized to bias the upper cutting blade assembly 58 away from the lower cutting blade assembly 32 to position the glass workpiece 100 in a position shown in FIG. 7. The handle 44 can be released biasing the upper cutting blade assembly 58 toward the lower blade assembly 32 until the arm 46 abuts against stop 66 positioning cutting blade assemblies 58 and 32 in the operative position for scoring the glass workpiece 100. During the cutting operation, the pattern 102 abuts against the pattern following wheel 60 to assure that the cutting unit 16 is precisely cutting the appropriate shape. The spacer 104 is sized such that when the glass workpiece is between the cutter assemblies 58 and 32, the pattern 102 is aligned with the pattern following wheel 60. After the scoring operation is completed, the scored glass can be snapped off in a conventional fashion along the score lines created. As shown in FIG. 7, it is preferred that the upper and lower cutting blade assemblies 58 and 32 be aligned such that the cutting blades score along the same line on opposed sides of the glass workpiece 100.

Figure 9:
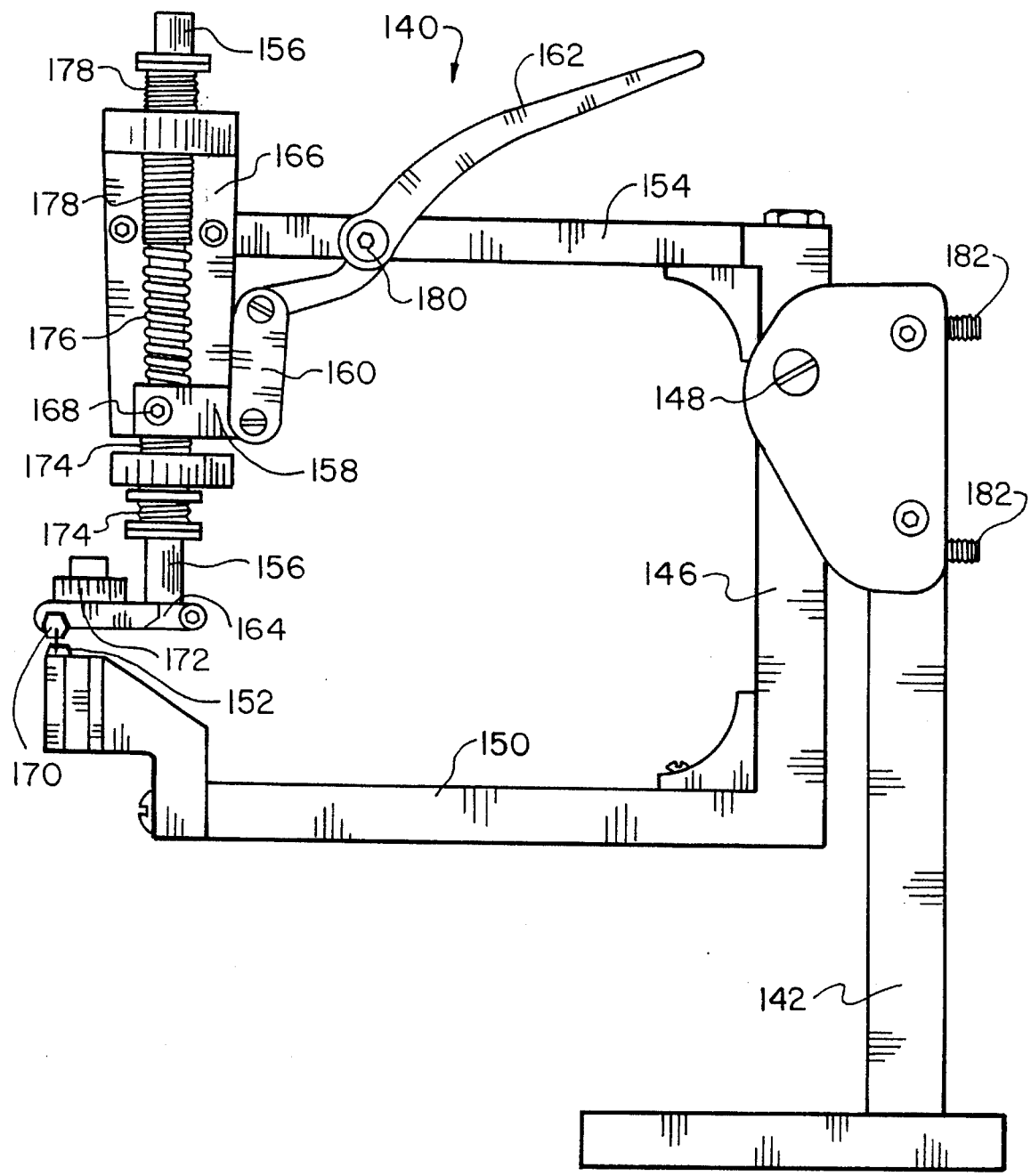
FIG. 9 is a side view of a cutting unit according to a second embodiment of the present invention.

Following the snapping along the score lines, the edges of the cut glass workpiece 100 are polished on the grinding unit 18 as shown in FIG. 9. During the grinding operation, the pattern 102 abuts against the pattern guide tube 110 to assure that the rotatable grinder 108 does not remove any excess material from the edge of the glass workpiece 100 during the grinding and polishing operation. The pattern guide tube 110 is adjustable, as described above, to appropriately orientate the edge of the guide tube 110 relative to the rotatable grinder 108 to assure proper polishing of the edge of the cut glass workpiece 100.

FIG. 9 illustrates a cutting unit 140 according to a modified version of the present invention. The cutting unit 140 includes a base stand 142 which can be attached to base 12 by nut and bolt connections 24. A connecting arm 146 is pivotally attached to the base stand 142 by pivot pin 148. A lower radial arm 150 is attached to a lower portion of the connecting arm 146. A lower cutting blade assembly 152 is attached to a distal end of the lower radial arm 150.

An upper radial arm is attached to an upper end of the connecting arm 146 on the opposite side of the pivot pin 48 from the lower radial arm 150. The upper radial arm includes support arm 154, vertical post 156, stop block 158, linkage 160, handle 162 and mounting member 164. One end of the support arm 154 is attached to an upper portion of the connecting arm 146. A second end of the support arm 154 includes a mounting bracket 166 which slidably receives vertical post 156 therethrough. The stop block 158 is secured to the vertical post 156 by screw 168. Mounting member 164 is attached to a lower end of the vertical post 156. Upper cutting blade assembly 170 is attached to an opposite end of the mounting member 164. A pattern following wheel 172 is rotatably attached to an upper surface of the mounting member 164 at an end substantially adjacent to the upper cutting blade assembly 170.

The stop block 158 rests against an annular stop 174 which is threaded into the mounting bracket 166. Spring 176 biases the stop block 158 against the annular stop 174. Annular stop 178, which is threaded into an upper part of the mounting bracket 166, provides a tensioning mechanism for the spring 176. Linkage 160 connects the stop block 158 to handle 162 which is pivoted about pivot pin 180 to the support arm 154.

The cutting unit 140 operates substantially the same as the cutting unit 16 discussed above. The cutting unit 140 provides a fixed, aligned position for the cutting blade assembly 152 and the upper cutting blade assembly 170 eliminating the need for various adjustments. The annular stop 174 allows for an adjustment of the operative position of the cutting blade assembly. As with the cutting unit 16, the connecting arm 146 is allowed to pivot slightly about pivot pin 148 and may be provided with a spring (not shown) on either side of the pivot pin 48 which can be adjusted by tension studs 182 in substantially the same manner as discussed above in connection with cutting unit 16. Additionally, as with cutting unit 16, one of the cutting blade assemblies may be replaced with a follower wheel thereby providing for cutting only on one surface of the glass. Such cutting is appropriate with certain types of glass.

The glass cutting apparatus 10 of the present invention provides simple and quick cutting of glass workpieces 100 according to a predetermined pattern 102. Once various patterns 102 have been created, various glass workpieces 100 can be reliably and uniformly reproduced on the glass cutting apparatus 10 of the present invention. The glass cutting apparatus 10 of the present invention minimizes user inexperience or error in cutting glass workpieces 100 according to a pattern 102. The glass cutting apparatus 10 of the present invention is additionally quickly adapted for use for cutting glass or pieces with or without the associated patterns 102. The glass cutting apparatus 10 may also be used to cut other frangible workpieces, such as ceramic tile.

Having described the above-presently preferred embodiments of the present invention, it is to be understood that it may be otherwise embodied within the scope of the appended claims.

I claim:

1. A glass cutting apparatus for cutting glass into preset patterns, said apparatus comprising:

a workpiece holder adapted to simultaneously hold a glass workpiece and a pattern thereon; and a cutting unit including at least one cutter blade for scoring the glass workpiece which is held by said workpiece holder, and a pattern follower adapted to abut against the pattern held by said workpiece holder during scoring of the glass workpiece by said cutter, wherein said cutting unit includes:

an upper and lower radial arm spaced from each other and adapted to be positioned on opposite sides of the glass workpiece held by said workpiece holder, and at least one of said radial arms having one said cutting blade attached thereto and one of said radial arms having said pattern follower attached thereto, wherein said pattern follower includes a wheel rotatably attached to one said radial arm.

2. The glass cutting apparatus of claim 1 wherein said cutting unit includes means for adjusting the space between said radial arms when said cutting unit is in an operative position.

3. The glass cutting apparatus of claim 1 wherein said cutting unit includes means for biasing said upper and radial arms toward each other to an operative position with said radial arms at a distance from each other.

4. The glass cutting apparatus of claim 3 wherein at least one of said radial arms is movable away from the other of said radial arms out of said operative position.

5. The glass cutting apparatus of claim 1 wherein said cutting unit further includes a connecting arm attached to said upper and lower radial arms; and a cutting unit base stand, wherein said connecting arm is pivotally attached to said cutting unit base stand.

6. The cutting apparatus of claim 1 wherein two said cutting blades are provided with one said cutting blade attached to each said radial arm.

7. The cutting apparatus of claim 6 wherein said two cutting blades are aligned with each other for scoring opposed sides of the glass workpiece along a single line.

8. A glass cutting apparatus for cutting glass into preset patterns, said apparatus comprising:

a workpiece holder adapted to simultaneously hold a glass workpiece and a pattern thereon, wherein said workpiece holder includes a pair of opposed clamping members for rotatably clamping the glass workpiece and the pattern therebetween; and wherein said workpiece holder includes a base member, a support arm rotatably attached to said base member at a first end thereof, a C-shaped frame rotatably attached to a second end of said support arm, and wherein said clamping members are attached to said C-shaped frame and a cutting unit including at least one cutter blade for scoring the glass workpiece which is held by said workpiece holder, and a pattern follower adapted to abut against the pattern held by said workpiece holder during scoring of the glass workpiece by said cutter.

9. A glass cutting apparatus for cutting glass into preset patterns, said apparatus comprising:

a workpiece holder adapted to simultaneously hold a glass workpiece and a pattern thereon, wherein said workpiece holder includes a pair of opposed clamping members for clamping the glass workpiece and pattern therebetween, a base member, a support arm rotatably attached to said base member at a first end thereof, a C-shaped frame rotatably attached to a second end of said support arm, and wherein said clamping members are attached to said C-shaped frame;

a cutting unit including at least one cutter blade for scoring the glass workpiece which is held by said workpiece holder, and a pattern follower adapted to abut against the pattern held by said workpiece holder during scoring of the glass workpiece by said cutter; and a grinding unit having a rotatable grinder for grinding an edge of the glass workpiece which is held by said workpiece holder, and a grinding unit pattern follower adapted to abut against the pattern held by said workpiece holder during grinding of the edge of the glass workpiece by said grinder.

10. The glass cutting apparatus of claim 9 wherein said grinding unit pattern follower is radially adjustable relative to said grinder.

11. The glass cutting apparatus of claim 10 wherein said grinding unit pattern follower comprises a curved surface having a radius of curvature substantially the same as said grinder.

12. The glass cutting apparatus of claim 9 further including a base wherein said workpiece holder, said cutting unit and said grinding unit are attached to said base at spaced locations thereon.

13. The glass cutting apparatus of claim 12 further including a workpiece support table adapted to support a glass workpiece thereon, said table including a slidable backstop adapted to abut against an end of the glass workpiece supported on said table.

14. The glass cutting apparatus of claim 13 wherein said backstop is angularly adjustable relative to said table.

15. A glass cutting apparatus for cutting a glass workpiece according to a predetermined pattern, said apparatus comprising:

a cutting unit including a pair of aligned, opposed cutting blades for scoring opposed sides of the glass workpiece, the pattern follower adapted to abut against the pattern during scoring of the glass workpiece by said pair of cutter blades; and a workpiece holder adapted to rotatably hold the glass workpiece and the pattern which overlays the glass workpiece thereon, said workpiece holder including a pair of opposed clamping members for rotatably clamping the pattern and glass workpiece thereon and wherein said workpiece holder includes a base member, a support arm rotatably attached to said base member at a first end thereof, a C-shaped frame rotatably attached to a second end of said support arm, and wherein said clamping members are attached to said C-shaped frame.

16. The glass cutting apparatus of claim 15 further including a grinding unit having a rotatable grinder for grinding an edge of the glass workpiece which is rotatably held by said workpiece holder, and a pattern follower adapted to abut against the pattern rotatably held by said workpiece holder during grinding of the edge of the glass workpiece by said grinder.

* * * * *

UNITED STATES PATENT AND TRADEMARK OFFICE
CERTIFICATE OF CORRECTION

PATENT NO. : 5,558,565
DATED : September 24, 1996
INVENTOR(S) : Victor DeDonato

It is certified that error appears in the above-indentified patent and that said Letters Patent is hereby corrected as shown below:

Title page, item '[76] Inventor:', "Dedonato" should read --DeDonato--.

Column 2 Line 24 after "during" insert --a--.

Claim 8 Line 21 Column 7 "therebetween; and" should read --therebetween and--.

Claim 8 Line 26 Column 7 "frame and" should read --frame; and--.

Signed and Sealed this

Third Day of December, 1996

Attest:

BRUCE LEHMAN

Attesting Officer   Commissioner of Patents and Trademarks